United States Patent
Zhang et al.

(10) Patent No.: US 8,799,192 B2
(45) Date of Patent: Aug. 5, 2014

(54) DERIVING A NESTED CHAIN OF DENSEST SUBGRAPHS FROM A GRAPH

(75) Inventors: Bin Zhang, Fremont, CA (US); Meichun Hsu, Los Altos Hills, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 372 days.

(21) Appl. No.: 13/406,843

(22) Filed: Feb. 28, 2012

(65) Prior Publication Data
US 2013/0226840 A1    Aug. 29, 2013

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

| | | | |
|---|---|---|---|
| 7,788,210 B2 | 8/2010 | Lang et al. | |
| 2011/0119269 A1 | 5/2011 | Agrawal et al. | |
| 2011/0234594 A1* | 9/2011 | Charles et al. | 345/440 |
| 2012/0110089 A1* | 5/2012 | Wang et al. | 709/205 |

OTHER PUBLICATIONS

Gregory "An Algorithm to Find Overlapping Community Structure in Networks", PKDD, 2007, pp. 91-102.*
Anderson, et al, "Finding Dense Subgraphs with Size Bounds", WAW '09 Proceedings of the 6th International Workshop on Algorithms and Models for the Web—Graph, 2009.
Gibson et al, "Discovering Large Dense Subgraphs in Massive Graphs", Proc. of the 31st VLDB Conf, Trondheim, Norway, 2005.
Khuller, et al, "On Finding Dense Subgraphs", ICALP 2009, pp. 12.
Lang, et al, "Finding Dense and Isolated Submarkets in a Sponsored Search Spending Graph", CIKM '07, Nov. 6-8, 2007, Lisboa, Portugal.

* cited by examiner

*Primary Examiner* — Li-Wu Chang (57) ABSTRACT

A nested chain of densest subgraphs is derived by a computer from a given graph that has multiple vertices and edges. The two ends of each edge are assigned with respective incident weights, and each vertex is given a vertex weight. A weight balancing process is carried out by the computer to iteratively go through the edges to adjust the incident weights of each edge and the vertex weights of the vertices connected by that edge to reduce a difference between the vertex weights of the two vertices. After the balancing, the vertex weights are put in an ordered sequence according to their values, and a nested chain of densest subgraphs is derived from the ordered sequence.

15 Claims, 8 Drawing Sheets

DERIVING A NESTED CHAIN OF DENSEST SUBGRAPHS FROM A GRAPH

BACKGROUND

Graph analysis techniques are used to study graphs that model pair-wise relations between objects. A graph is a collection of "vertices" (or "nodes") and a collection of "edges" (or "links") that connect pairs of vertices. The vertices of a graph may represent various types of objects, such as persons, websites, machines, etc., and the edges may represent various types of relations between the objects represented by the vertices. Graph analyses have found applications in many different contexts for answering different types of inquiries. For instance, graph analysis techniques have been used to study the World Wide Web, telephone communications, social networks, resource allocations, etc. In many real-world applications, graphs being studies can be fairly complex and massive, with many vertices and edges, and the analyses are computation-intensive. A graph analysis technique capable of processing a complex graph in an efficient way to extract useful information can be very valuable.

DETAILED DESCRIPTION

In embodiments of the invention described below, an efficient computer-implemented graph analysis technique is provided. For a given graph to be analyzed, the novel technique is capable deriving, with high computational efficiency, a nested chain of densest subgraphs from the graph.

Figure 1:
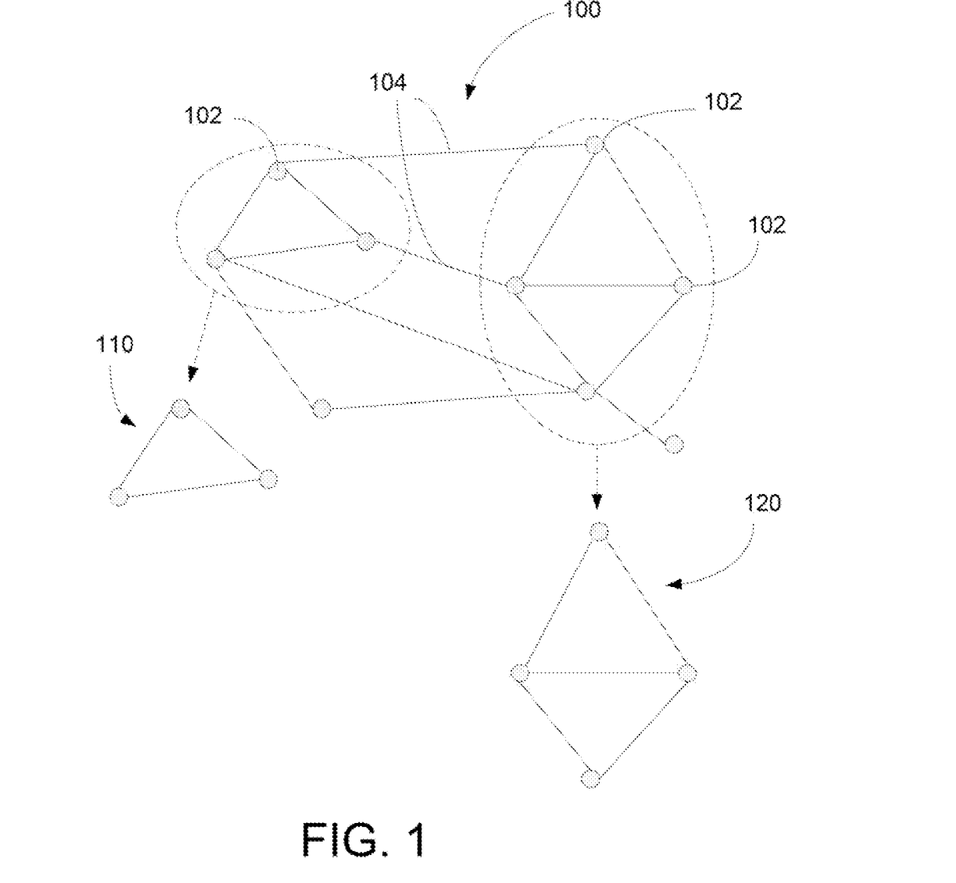
FIG. 1 is a diagram showing a example of a graph and a subgraph within that graph.

Referring now to FIG. 1, a graph 100 may include a plurality of vertices 102. The vertices, which are also sometimes referred to as "nodes" in the literature of graph analytics, may be used to represent different types of objects. The graph 100 also includes a plurality of edges 104, sometimes referred to as "links" in the literature. Each edge 104 connects two vertices 102 together, and may be used to represent a kind of relation between the two connected vertices. Depending on the objects represented by the vertices and the relations presented by the edges, each edge may be given a weight $w_e$. In some applications, the weight of each edge can be simply set to 1, while in other applications the weight may be set to another integer or a non-integer number.

Also illustrated in FIG. 1 are two subgraphs 110 and 120 of the graph 100. A subgraph includes a collection of vertices that is a subset of the vertices in the graph 100, and a collection of edges that is a subset of the edges of the graph. For subgraphs considered herein, for any two vertices in the subgraph, if they are connected by an edge, that edge also belongs to the subgraph. In a given graph, there may be many different subgraphs that can be formed by different selections of vertices and corresponding edges. In this regard, the term "k-subgraph" refers to a subgraph that has k vertices, where k is an integer. Also, the term "densest k-subgraph" means a subgraph that has k vertices and has a maximum sum of the edge weights among all k-subgraphs within the graph.

Figure 2:
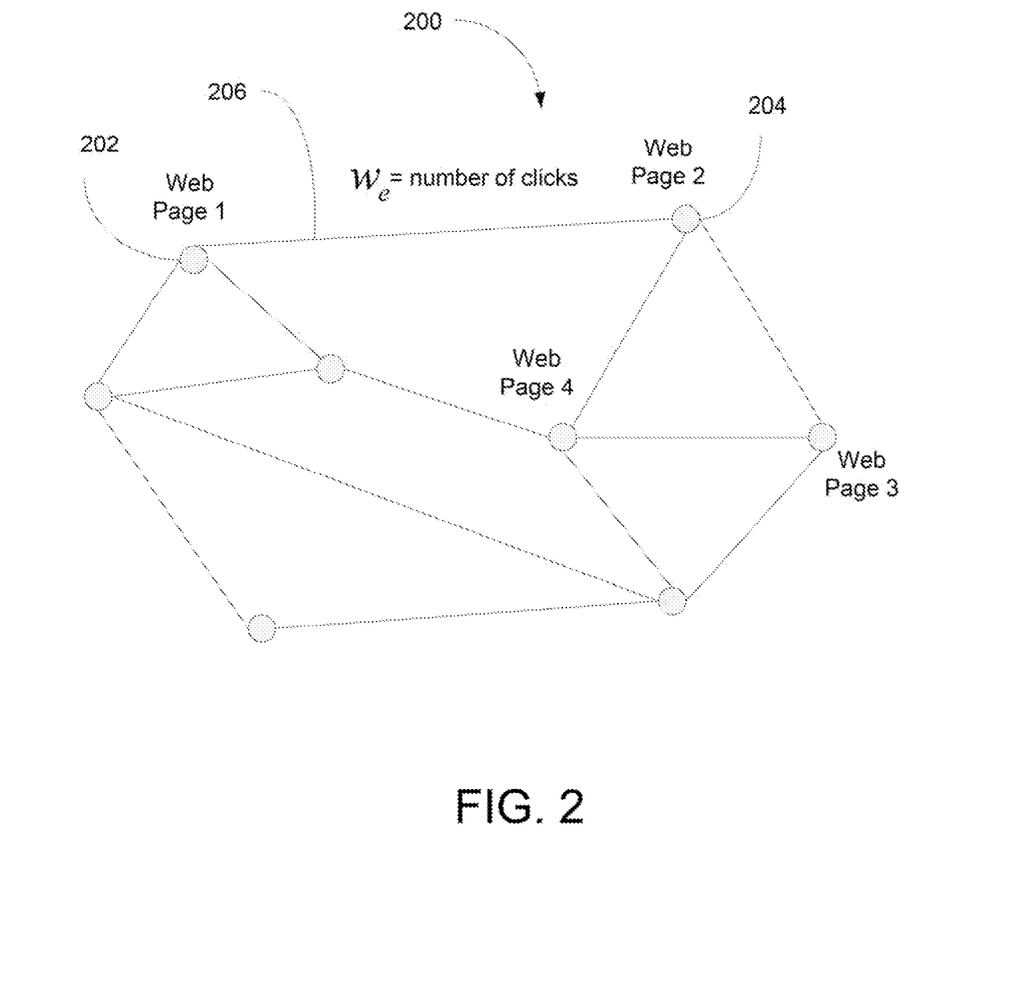
FIG. 2 is a diagram showing an example of vertices and edges in a part of a graph with vertices representing websites.
Figure 3:
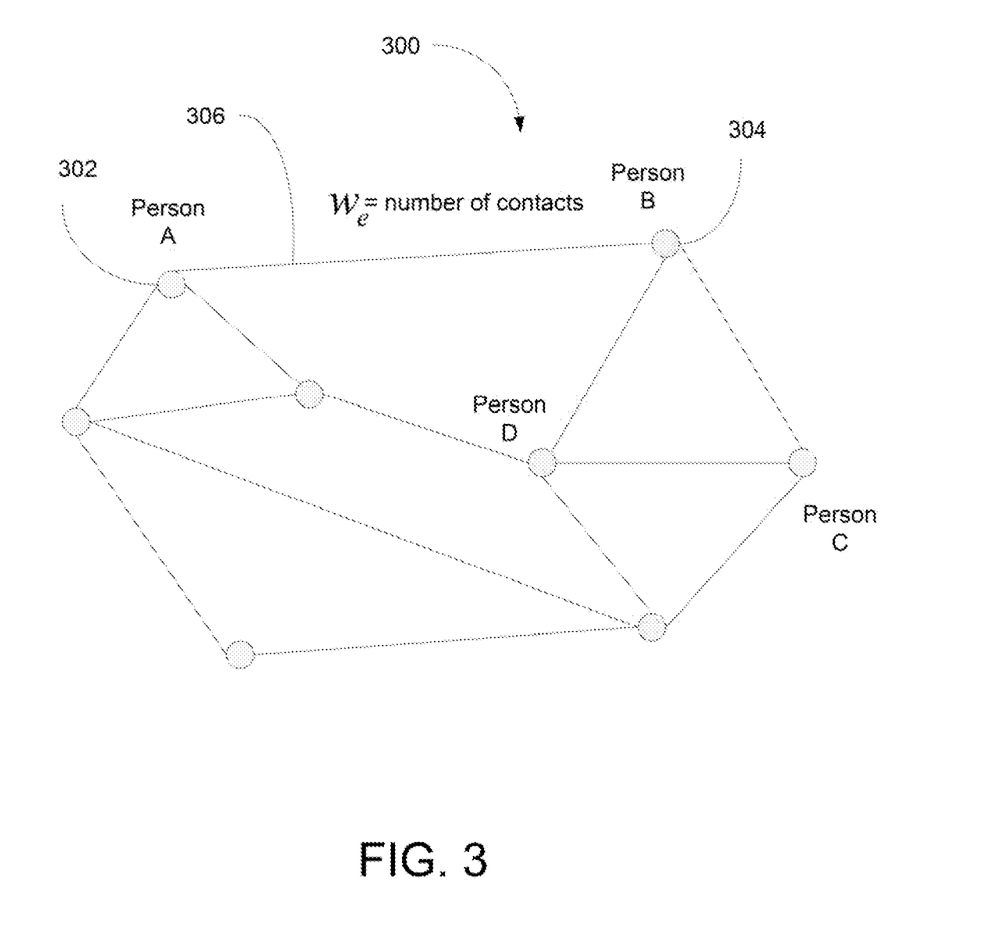
FIG. 3 is a diagram showing an example of vertices and edges in a social-networking graph with vertices representing persons in a social network.

As mentioned above, the vertices and edges in a graph can be used to represent various types of objects and relations. To illustrate this point, two examples are shown in FIG. 2 and FIG. 3. In the example of FIG. 2, the vertices 202 and 204 of the graph 200 represent web pages, which are "connected" by hyperlinks, and such connections are represented by the edges 206. The weight assigned to an edge 206 may indicate the count, or the frequency, of clicks on the hyperlinks to go from one web page to the other. In this context, communities of highly linked web pages can be found by analyzing the graph to identify densest subgraphs. In the example of FIG. 3, the graph 300 is used to represent a social network. In this context, the vertices 302, 304 may represent individual persons, and an edge 306 connecting two vertices indicates that the two persons represented by the vertices know each other. The weight assigned to the edge 306 may be the number of times the two persons communicated with or made references to each other on a social networking website. Studying such a social network graph to find densest sub-graphs may provide information regarding cliques or communities within the social network.

The graph analysis technique of embodiments of the invention provides a new approach to analyzing a graph to gain insight of the graph. In conventional graph analyses, a common inquiry is: for the given graph and a given number k, find the densest k-subgraph. In contrast, the technique of embodiments of the invention solves a different problem. Specifically, for a given graph, the technique derives a nested chain of densest subgraphs in the graph. The densest subgraphs in the nested chain have different k values (i.e., different numbers of vertices), and those values are not pre-selected by the query, but rather to be discovered by means of the analysis and provided as part of the output. The sequence of the k values of the nested densest subgraphs includes the solution to another kind of densest subgraph problem, which is to find the maximum density of subgraphs as a function of k.

Figure 4:
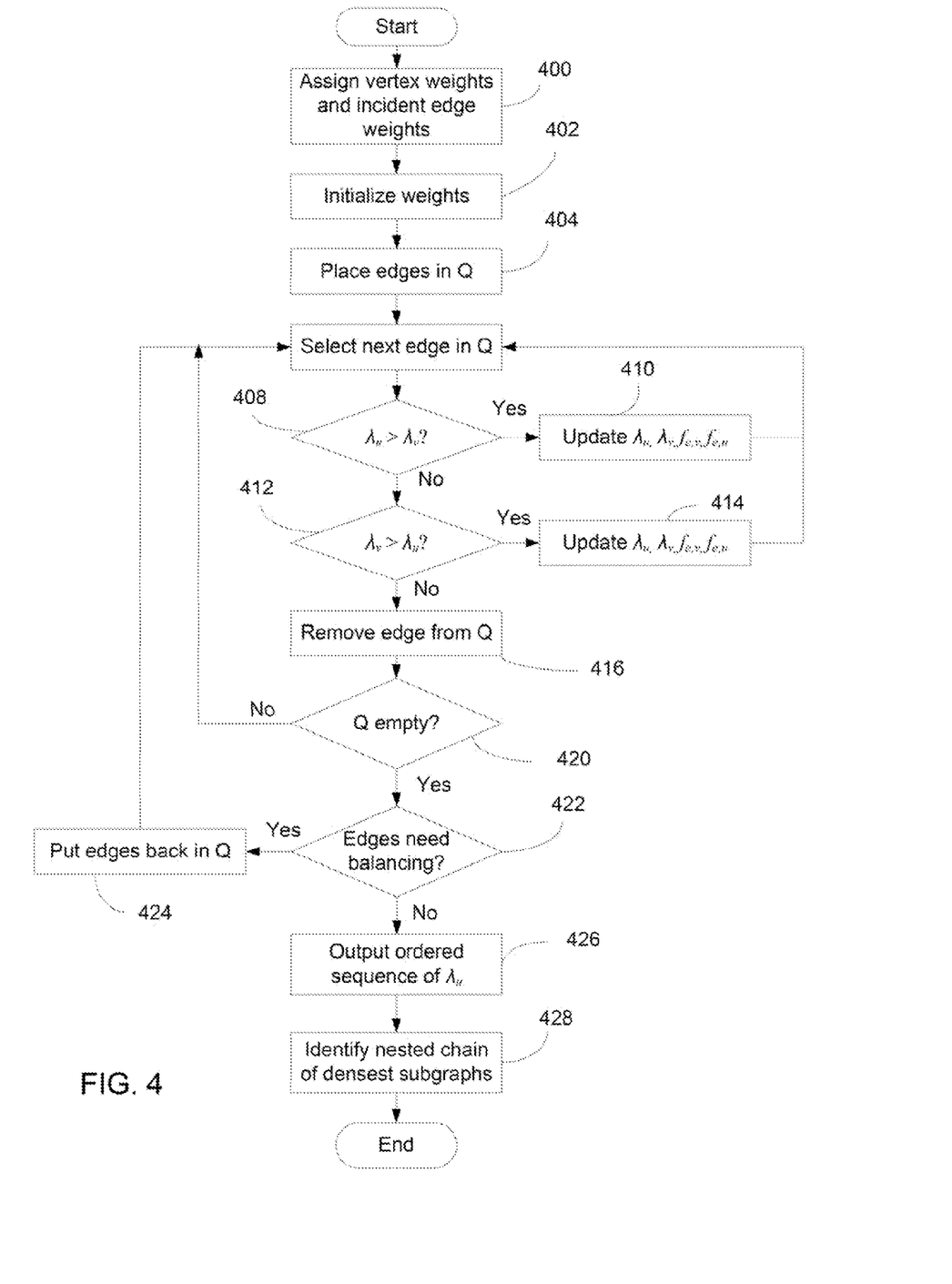
FIG. 4 is a flowchart showing a computer-implemented process according to an embodiment of the invention for deriving a nested chain of densest subgraphs from a given graph.
Figure 5:
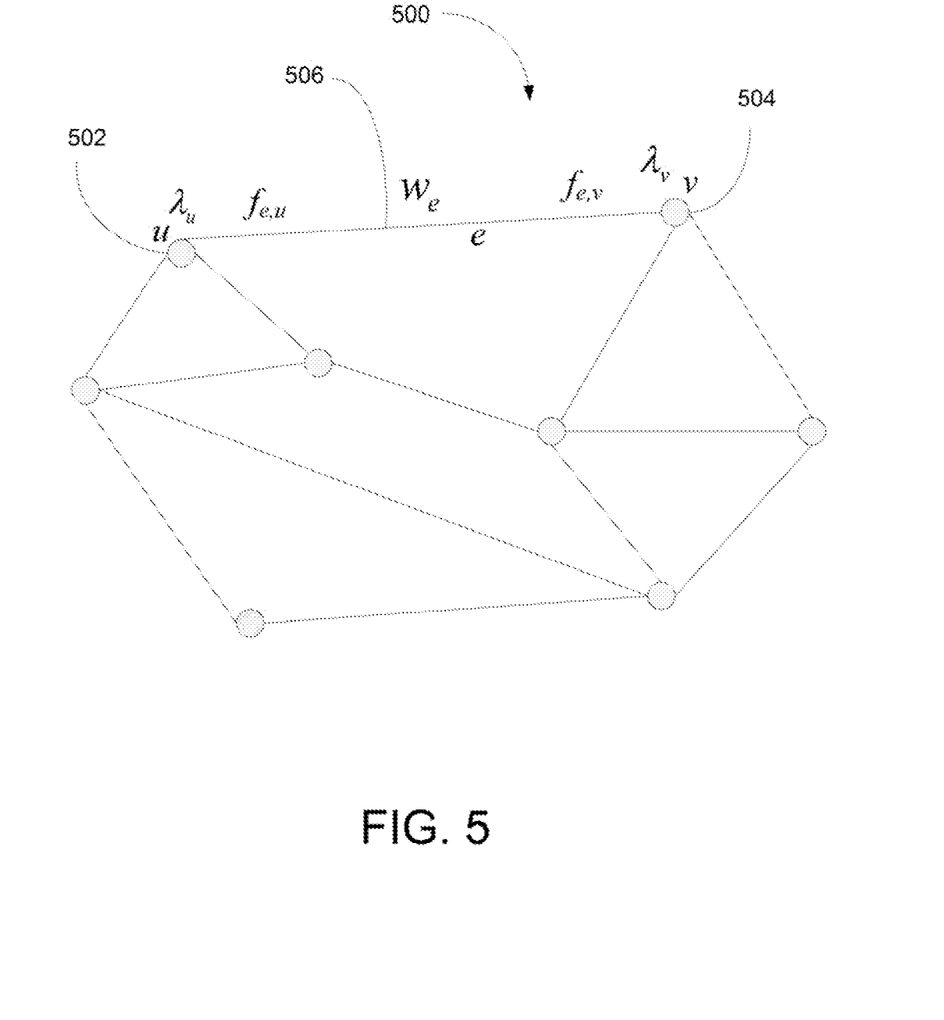
FIG. 5 is a diagram showing the assignment of variables to edges and vertices of a graph being analyzed.

The graph analysis technique is now described with reference to the flowchart of FIG. 4 and the diagrams in FIG. 5 and FIG. 6. The graph analysis is carried out by a graph analyzer module implemented on a digital computer. Turning now to FIG. 4, the analysis of the graph starts with assigning variables to the edges and vertices of the graph to be analyzed (step 400), for use in the subsequent steps of the analytic process. As illustrated in FIG. 5, the end of each edge in the graph 500 to be analyzed is assigned an incident weight. For example, the first end of the edge e (reference numeral 506) incident to the vertex u (reference numeral 502) is assigned an incident weight denoted $f_{e,u}$, and the second end of the edge e incident to the vertex v (reference numeral 504) is assigned an incident weight denoted $f_{e,v}$. Also, for each vertex in the graph 500, a vertex weight is assigned to the vertex. For example, the vertex u is assigned a vertex weight denoted $\lambda_u$, and the vertex v is assigned a vertex weight denoted $\lambda_v$.

The incident weights of the edges and the vertex weights of the vertices are then initialized (step 402). In one embodiment, the two incident weights of each edge are each initialized to half of the weight of the edge. Thus, for the edge e connecting the vertices u and v:

$$f_{e,v} = f_{e,u} = \frac{w_e}{2}$$

In this regard, in this embodiment the graph is assumed to be "undirected" in that the weight $w_e$ of any edge e does not depend on the direction in which the edge is traversed. It should be noted that it is only a convenient choice to set the edge incident weights to half of the edge weight. The incident weights may, for instance, be initialized to other portions of the edge weight, and the portions used in the initialization are not critical. The vertex weight for a vertex is initialized to a value that is sum of the incident weights of all edge ends incident to that vertex. Thus, for the vertex u, its vertex weight is:

$$\lambda_u = \sum_{e \text{ incident to } u} f_{e,u}$$

After the initialization of the edge incident weights and the vertex weights, the graph analyzer module carries out a vertex weight balancing operation. This balancing operation is an iterative process. First, a round-robin queue Q is set up, and all edges are placed into the queue (step 404). The order in which the edges are placed in the queue is not critical, although some ordering could speed up the calculation convergence and reduce the time needed for the processing. Next, the analyzer module loops through the edges in the queue and performs weight balancing to each edge and also the corresponding vertices. The weight balancing is done for each edge when there is an "imbalance" between the weights of the two vertices on the two ends of the edge.

If $\lambda_u > \lambda_v$ and $f_{e,u} > 0$ (Condition 1, step 408), an adjustment variable δ is set:

$$\delta = \min\left\{\left\lfloor\frac{\lambda_u - \lambda_v}{2}\right\rfloor, f_{e,u}\right\}$$

The vertex weights $\lambda_u$, $\lambda_v$ of the vertices u and v, and the incident weights $f_{e,u}$ and $f_{e,v}$ of the edge e are updated (step 410) as follows:

$$\lambda_u = \lambda_u - \delta, \lambda_v = \lambda_v + \delta, f_{e,u} = f_{e,u} - \delta \text{ and } f_{e,v} = f_{e,v} + \delta$$

The effect of the balancing operation is to reduce the difference between the vertex weights $\lambda_u$, $\lambda_v$ by shifting the incident weight from one end of the edge e to the other end. It should be noted that the sum of the two incident weights $f_{e,u}$ and $f_{e,v}$ of the edge remains the same.

Similarly, if $\lambda_v > \lambda_u$ and $f_{e,v} > 0$ Condition 2, step 412), the adjustment variable δ is set:

$$\delta = \min\left\{\left\lfloor\frac{\lambda_v - \lambda_u}{2}\right\rfloor, f_{e,v}\right\},$$

and the vertex weights $\lambda_u$, $\lambda_v$ and the incident weights $f_{e,u}$ and $f_{e,v}$ are updated (step 414) as follows:

$$\lambda_v = \lambda_v - \delta, \lambda_u = \lambda_u + \delta, f_{e,v} = f_{e,v} - \delta \text{ and } f_{e,u} = f_{e,u} + \delta$$

After the balancing step is done, the edge is put back in the queue.

If neither of the above Conditions 1 and 2 applies to the edge, the edge is deactivated by removing it from the queue (step 416). If the queue is not empty (step 420), the process moves to the next edge in the queue. In this way, the process continues to loop through the edges in the queue and perform the balancing as described above. When the queue becomes empty, the analyzer module checks each edge to ensure that there is no more balancing to be done (step 422). If there are still edges that need to be balanced, i.e., they meet either Condition 1 or 2, they are put back into the queue (step 424), and the iterative balancing operation continues until there is no more edge to be balanced. This situation can happen because the vertex weights of a deactivated edge can be changed by later balancing operation on the other edges.

Thereafter, the analyzer module sorts all vertices in the graph according to their post-balancing vertex weights in a decreasing order. This sequence 600 of the vertex values is shown in FIG. 6, together with the identifications 602 of the corresponding vertices. The sequence of vertex values and identifications of the corresponding vertices can be produces as computational output of the analyzer module for review by a user or used as input for further computations.

Figure 6:
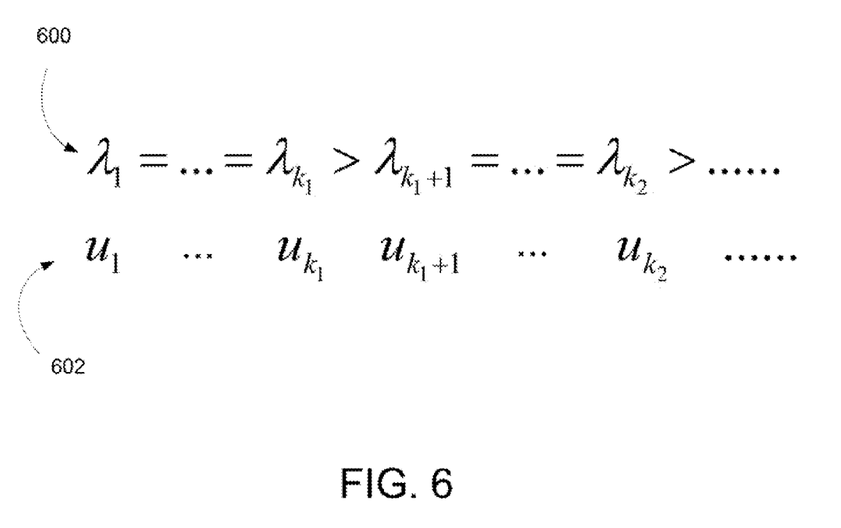
FIG. 6 is a diagram illustrating a sequence of vertex weight values generated by a balancing operation in the process of FIG. 4.

As shown in FIG. 6, the vertex weights of the vertices after the balancing operation are put in a sequence 600 in a descending order. In that sequence, a vertex weight $\lambda_i$ may be equal to or greater in value than the subsequent vertex weight. For example, in the illustrated sequence, the vertex weight $\lambda_{k1}$, which corresponds to the vertex $u_{k1}$, is equal to the weight $\lambda_{k1-1}$, but greater than the next weight $\lambda_{k1+1}$, which corresponds to the vertex $u_{k1+1}$.

This sequence of vertex weights provides useful information regarding the graph, because whenever there is a strict decrease of vertex weight, the vertices corresponding to the vertex weights in the sequence prior to the decrease form a densest subgraph. For example, when a strict decrease occurs at $\lambda_{k1} > \lambda_{k1+1}$, then the subgraph with vertices $\{u_1, \ldots, u_{k1-1}, u_{k1}\}$ is a densest subgraph with k1 vertices. When a strict decrease of the vertex weights occurs at $\lambda_{k2} > \lambda_{k2+1}$, the vertices $\{u_1 \ldots, u_{k1} \ldots, u_{k2}\}$ form another densest subgraph with k2 vertices. Thus, a series of densest subgraphs, with increasing numbers of vertices, can be identified from the sequence 600 shown in FIG. 6. It should be noted that the sequence does not provide a densest subgraphs at any given k. Rather, densest subgraphs may be derived from the sequence at a series of k values: k1, k2, k3, etc., which may not be consecutive in value. This series of k values is indentified by examining the vertex weight sequence. In other words, the series of k values for densest subgraphs is the output of the graph analysis technique. It can be shown that for each k values in the series, the corresponding densest subgraph is the only densest subgraph for the given k in the graph.

Figure 7:
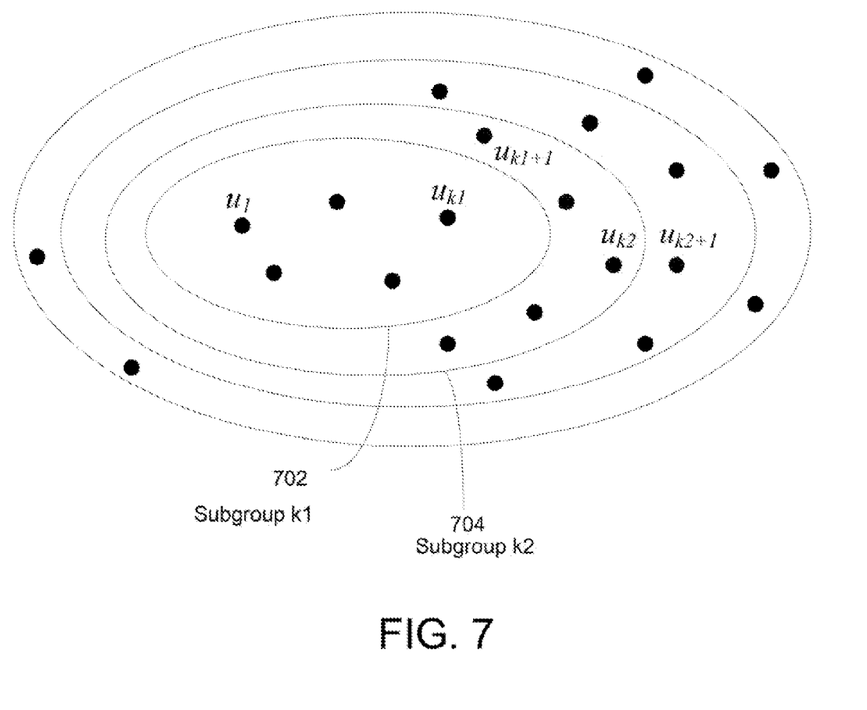
FIG. 7 is a diagram illustrating a grouping of vertices of a graph that forms a nested chain of densest subgraphs.

One property of the densest subgraphs derived from the vertex weight sequence is that they are nested. This concept is illustrated in FIG. 7. As illustrated in FIG. 7, the vertices of each densest subgraph are grouped together and enclosed in an eclipse. For instance, the vertices of the densest subgraph for the value k1 are enclosed by the ellipse 702, and the vertices of the densest subgraph for the value k2 are enclosed by the ellipse 704. All the vertices of the densest subgraph for k1 are included in the vertices of the densest subgraph for k2. Thus, the densest subgraphs of the series k1, k2, k3, etc. form a nested chain in the sense that, for k2>k1, the densest subgraph of k1 is contained in the densest subgraph of k2.

Figure 8:
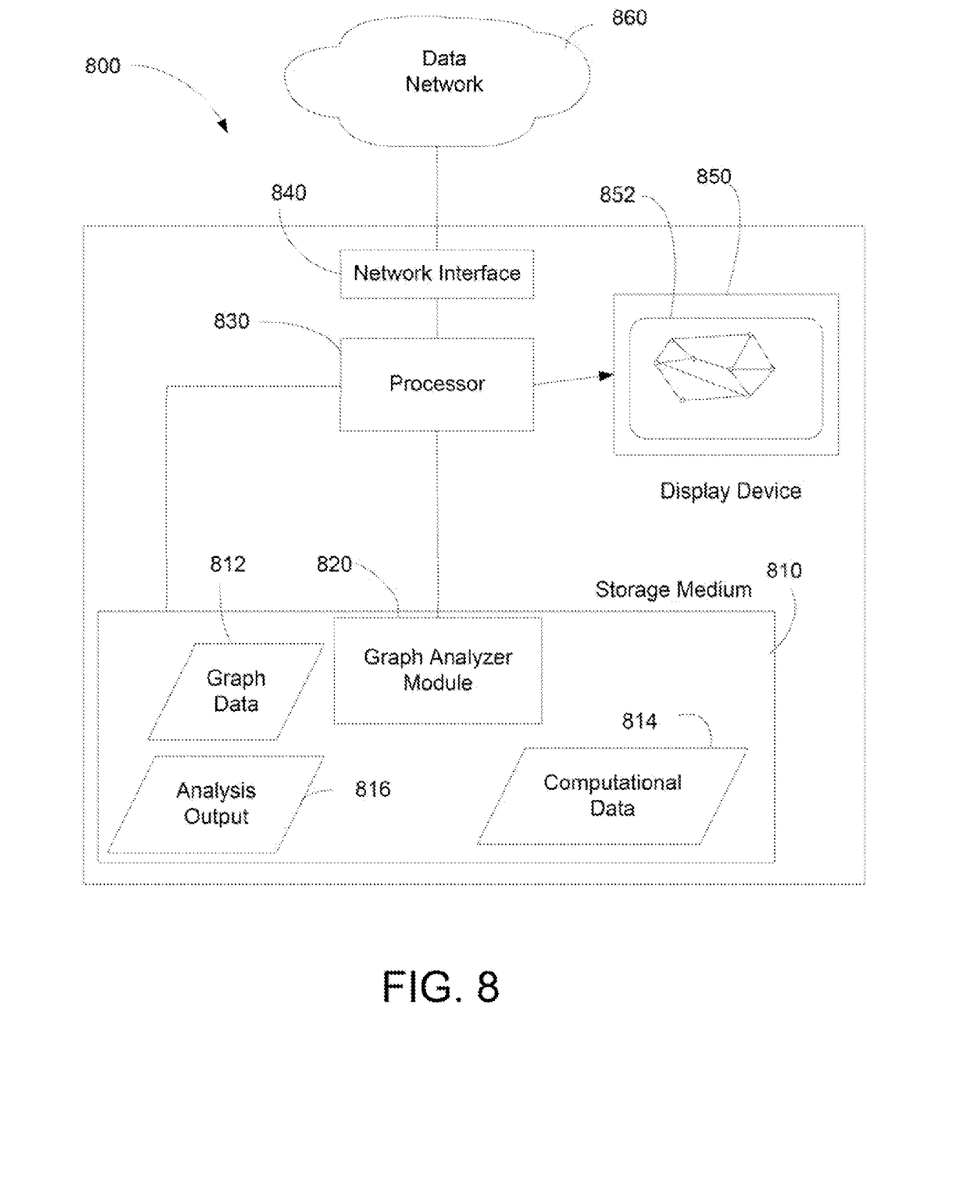
FIG. 8 is a computer system in an embodiment for implementing the process of deriving a nested chain of densest subgraphs from a graph.

FIG. 8 shows a computer system 800 for implementing the graph analysis technique described above. The system 800 includes a data storage medium 810 which may be used to store data 812 of the graph to be studied, including data regarding the vertices, edges, and edge weights. The storage medium 810 may also be used to store the computational data 814 generated during the analytic process, such as the vertex weights of the vertices and the incident weights of the edges in different stages of the process. The output data 816 of the analysis, such as the final sequence of balanced vertex weights, may also be stored on the storage medium 810. The storage medium 810 is non-transitory and can be implemented as one or more computer-readable or machine-readable storage devices, including DRAMS, SRAMS, flash drives, hard drives, optical storage devices, etc. The system 800 includes a graph analysis module 820 for performance the analytic operations on the graph to be studied. The graph analysis module 820 can be implemented as machine-readable instructions executable on a processor 830. The machine readable instructions may be stored on the storage medium 810. Alternatively, the graph analysis module may be stored in a separate non-transitory storage device. The system 800 may include a network interface 840 for communicating with a data network 860. The system may also include a display device 850 with a display screen 852, which can be used to display images and data, such as the graph to be analyzed and the final sequence of vertex weights.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of analyzing a graph having multiple vertices and edges, comprising:
   assigning incident weights to first and second ends of each edge in the graph;
   assigning a vertex weight to each vertex in the graph;
   initializing the incident weights of the edges and the vertex weights of the vertices;
   performing a weight-balancing operation on the edges and vertices, including iteratively going through the edges to adjust the incident weights of each edge and the vertex weights of two vertices connected by that edge to reduce a difference between the vertex weights of the two vertices connected by that edge;
   after the balancing operation, outputting the vertex weights in a sequence ordered according to values of the vertex weights; and
   deriving a nested chain of densest subgraphs from the ordered sequence based on a change of the vertex weights.

2. A method as in claim 1, wherein the vertex weight of each vertex in the graph is a sum of all incident weights of ends of edges incident to that vertex.

3. A method as in claim 2, wherein each edge in the graph has a weight, and wherein the step of initializing set the incident weights of the first and second ends of each edge to half of the weight of the edge.

4. A method as in claim 3, wherein the weights of edges in the graph are integers.

5. A method as in claim 2, wherein the weight-balancing operation reduces a difference between vertex weights of two vertices connected by each edge while keeping the incident weights of that edge not smaller than 0.

6. A method as in claim 1, wherein the step of deriving finds a densest subgraph by identifying a vertex weight in the sequence that is not equal to a next vertex weight in the sequence.

7. A method as in claim 1, wherein the vertices of the graph represent web pages.

8. A method as in claim 1, wherein the graph models a social network, and the vertices of the graph represent persons in the social network.

9. A non-transitory computer readable medium storing computer-executable instructions for analyzing a graph with multiple vertices and edges, the computer-executable instructions upon execution causing a system to perform steps of:
   assigning incident weights to first and second ends of each edge in the graph;
   assigning a vertex weight to each vertex in the graph, the vertex weight of each vertex being a sum of all incident weights of ends of edges incident to that vertex;
   initializing the incident weights of the edges and the vertex weights of the vertices;
   performing a weight-balancing operation on the edges and vertices, including iteratively going through the edges to adjust the incident weights of each edge and the vertex weights of two vertices connected by that edge to reduce a difference between the vertex weights of the two vertices connected by that edge;
   after the balancing operation, outputting the vertex weights in a sequence ordered according to values of the vertex weights; and
   identifying a nested chain of densest subgraphs from the ordered sequence based on a change of the vertex weights.

10. A non-transitory computer readable medium as in claim 9, wherein each edge of the graph has a weight, and the step of initializing sets the incident weights of the first and second ends of each edge to half of the weight of the edge.

11. A non-transitory computer readable medium as in claim 10, wherein the weight-balancing operation reduces a difference between vertex weights of two vertices connected by each edge while keeping the incident weights of that edge not smaller than 0.

12. A non-transitory computer readable medium as in claim 11, wherein the weights of edges in the graph are integers.

13. A non-transitory computer readable medium as in claim 9, wherein the step of deriving finds a densest subgraph by identifying a vertex weight in the sequence that is not equal to a next vertex weight in the sequence.

14. A non-transitory computer readable medium as in claim 9, wherein the vertices of the graph represent web pages.

15. A non-transitory computer readable medium as in claim 9, wherein the graph models a social network, and the vertices of the graph represent persons in the social network.

* * * * *